US012688837B2

(12) United States Patent
Mao et al.

(10) Patent No.: US 12,688,837 B2
(45) Date of Patent: Jul. 21, 2026

(54) PIXEL CIRCUITS FOR LIQUID CRYSTAL ON SILICON PHASE MODULATOR

(71) Applicant: Ohio State Innovation Foundation, Columbus, OH (US)

(72) Inventors: Chongchang Mao, Chapel Hill, NC (US); Lianhua Ji, Erie, CO (US); Kristina Johnson, Bexley, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 18/718,873

(22) PCT Filed: Dec. 16, 2022

(86) PCT No.: PCT/US2022/081765
§ 371 (c)(1),
(2) Date: Jun. 12, 2024

(87) PCT Pub. No.: WO2023/114979
PCT Pub. Date: Jun. 22, 2023

(65) Prior Publication Data

US 2025/0046265 A1 Feb. 6, 2025

Related U.S. Application Data

(60) Provisional application No. 63/290,150, filed on Dec. 16, 2021.

(51) Int. Cl.
*G09G 3/36* (2006.01)

(52) U.S. Cl.
CPC ... *G09G 3/3607* (2013.01); *G09G 2300/0426* (2013.01); *G09G 2300/0439* (2013.01); *G09G 2320/0247* (2013.01); *G09G 2360/18* (2013.01)

(58) Field of Classification Search
CPC ......... G09G 3/3607; G09G 2300/0426; G09G 2300/0439; G09G 2320/0247; G09G 2360/18
See application file for complete search history.

(56) References Cited

U.S. PATENT DOCUMENTS 5,627,557 A 5/1997 Yamaguchi et al.
7,460,101 B2 12/2008 Lee et al.
(Continued)

OTHER PUBLICATIONS

International Search Report and Written Opinion, dated Mar. 27, 2023, received in connection with corresponding International Patent Application No. PCT/US2022/081765.
(Continued)

*Primary Examiner* — Nathan P Brittingham
(74) *Attorney, Agent, or Firm* — Meunier Carlin & Curfman LLC

(57) ABSTRACT

Disclosed herein is a frame buffer pixel circuit having a first data pass gate transistor G1, first storage capacitor C1, a voltage boosting line Vb, source follower transistor F, pull-down transistor P, and second data pass gate transistor G2. The pull-down transistor P is connected to the drain of transistor F and source of transistor G2 and the storage capacitor C1 is connected to a voltage boosting line Vb. In the operation, Vb is set to zero volt when data is transferring to Cl capacitor through G1 gate. After the frame data are loaded onto C1 capacitors in all pixels, Vb is set to designed voltage and G2 gates in all pixels are opened to charge Clcd capacitors. Vb is then set to zero volt again before starting to load next frame data onto pixels. Such process is iterated in the liquid crystal on silicon (LCOS) working time.

9 Claims, 7 Drawing Sheets

(56) References Cited

U.S. PATENT DOCUMENTS

| | | | |
|---|---|---|---|
| 11,442,314 B2 | 9/2022 | Mao | |
| 2003/0001811 A1 | 1/2003 | O'Donnell | |
| 2003/0090478 A1 | 5/2003 | McKnight | |
| 2004/0196235 A1 | 10/2004 | Koyama et al. | |
| 2006/0001634 A1 | 1/2006 | Lee et al. | |
| 2012/0019503 A1 | 1/2012 | Lee et al. | |
| 2022/0050333 A1* | 2/2022 | Mao .................. | G02F 1/133638 |

OTHER PUBLICATIONS

European Search Report issued for Application No. 22908742.4, dated Oct. 27, 2025; 12 pages.

* cited by examiner

PIXEL CIRCUITS FOR LIQUID CRYSTAL ON SILICON PHASE MODULATOR

CROSS-REFERENCE TO RELATED APPLICATION

This application is a national stage application filed under 35 U.S.C § 371 of PCT Application No. PCT/US2022/081765, filed Dec. 16, 2022, entitled "PIXEL CIRCUITS FOR LIQUID CRYSTAL ON SILICON PHASE MODULATOR," which claims priority to U.S. Provisional Application No. 63/290,150, filed on Dec. 16, 2021, entitled "PIXEL CIRCUITS FOR LIQUID CRYSTAL ON SILICON PHASE MODULATOR," the disclosures of which are expressly incorporated herein by reference in their-entirety.

FIELD

The present disclosure relates generally to pixel circuits for liquid crystal on silicon (LCOS) phase modulator devices and, more particularly, to frame buffer pixel circuits that can improve the performance of phase modulators. While some embodiments will be described herein with particular reference to that application, it will be appreciated that the disclosure is not limited to such a field of use and may be applicable in broader contexts.

BACKGROUND

Liquid crystal on silicon (LCOS) devices are known in the art for use as optical phase modulators, among other applications. LCOS devices can spatially manipulate optical signals by applying a spatially dependent phase profile to the signals. This has many applications, including beam steering, image display, spectral compensation, and front wave shaping.

Referring to FIG. 1, there is illustrated schematically a conventional LCOS device 100, including a liquid crystal (LC) material 102 sandwiched between a transparent glass substrate 104 having a transparent electrode Vcom 106, and a metal mirror 108 mounted on a silicon substrate 110. The mirror 108 is divided into a two-dimensional (2-D) array of individually addressable pixels. Each pixel is individually drivable by a voltage signal to provide a local phase change to an optical signal, thereby providing a two-dimensional array of phase manipulating regions. The liquid crystal element is pre-aligned by two alignment layers 112*a*, 112*b*, which are disposed on the surfaces of the glass substrate 104 and the silicon substrate 110, respectively.

The second electrodes on the silicon backplane are composed of 2-D array pixel circuits. As shown in FIG. 2, a general analog pixel circuit 200 is composed of a CMOS data transfer gate G and a data storage capacitor C. In the operation, when the gate G is open, the data is transferred and stored on the capacitor to drive liquid crystal element. Such a pixel circuit is simple, but has several drawbacks, such as small driving voltage range, low contrast ratio, high image flickering, and low optical power efficiency for some applications.

The LCOS with the above pixel circuits use time sequential pixel addressing approach that is not suitable for some applications, such as holographic display and color sequential display. In such displays, the light sources have to be blocked when LCOS panel is loading frame data, resulting in low optical power efficiency and low image display quality. Another drawback of LCOS with such circuits is that the common electrode Vcom on the glass substrate has to be fixed at the mid potential of pixel output voltage range due to alternating current (AC) driving requirement for liquid crystal modulator. In order to realize AC driving to the LC element, one frame voltage profile is designed into two profiles in which one has positive potential voltages and the other one has negative potential voltages as compared to Vcom. Therefore, the maximum amplitude of the voltage applied to the LC element is half of that provided by pixels on the silicon backplane. The low LC driving voltage amplitude has serious impact on image grey scale.

Frame buffer pixel circuit technology has attracted attention to researchers and industry engineers. Lee et al. disclosed a frame buffer pixel circuit 300, as shown in FIG. 3 for LCOS display devices. The circuit is composed of the first data passing gate composed of CMOS transistors M1 and M2, a storage capacitor Cmem, a source follower transistor M3, and the second data passing gate with transistor M4. In the operation, when the first gate is opened, the data is transferred from data line to capacitor Cmem. After a frame data are stored in all pixel Cmem capacitors, the second data passing gates in all pixels are opened to transfer data to the pixel electrode (PE).

As compared with general LCOS phase modulators, the LCOS phase modulator with this frame buffer pixel circuit 300 can provide higher image contrast ratio and larger grey scale. And also, there is high potential to use the LCOS phase modulators with such frame buffer pixel circuits for holographic display, color sequential display, and wavefront correction for astronomical observation to significantly improve optical power efficiency and image quality. Another advantage of such frame buffer pixel is that the voltages applied to LC elements can be easily set down by adjusting the potential voltage of flip-flopped Vcom to meet requirements for different applications. This is very important for those LCOS phase modulators which require high voltages to fully drive LC elements such as polarization independent LCOS (PI-LCOS) phase modulators.

However, in order to maximize the output voltage range, CMOS data transfer gate is used in prior frame buffer pixel circuits, resulting in requirement of more doping wells. This may result in more complicated silicon backplane fabrication process, bigger pixel size, and lower yield. Another drawback of the prior frame buffer pixel circuits is that the output voltage at PE in such frame buffer pixel circuit is decayed fast due to current leakage and other effects, resulting in relatively large phase flickering of LCOS phase modulators.

SUMMARY

In prior frame buffer pixel circuits, the CMOS transistors are used, in order to maximize output voltage ranges of the pixel circuits. Such circuit structures result in drawbacks of larger pixel sizes, more complicated silicon backplane fabrication process, and lower yield as compared with the pixel circuits with only NMOS or PMOS transistors.

Accordingly, in some embodiments of the present disclosure, simple pixel circuits, small pixel sizes, large output voltage ranges, and stable voltages can be realized by using different frame buffer pixel circuit structures and voltage boosting technologies. A LCOS phase modulator with such pixel circuits has special applications such as high resolution, color sequential, and holographic displays.

The instability of potential voltage on each pixel results in phase fluctuation in a LCOS phase modulator. For those applications which have high restriction on signal flickering, the prior art can not be used in LCOS phase modulators, for example LCOS phase modulators for wavelength selective switch (WSS) used in telecom networks.

Accordingly, some embodiments of the present disclosure providing a method for making a stable phase in a LCOS modulator is proposed. A called source follower is added to keep charging the pixel output PE so that keep driving the liquid crystal element with stable potential voltage. With the invented circuits, LCOS phase modulators can significantly reduce phase flickering.

BRIEF DESCRIPTION OF THE DRAWINGS

Embodiments of the present disclosure will now be described, by way of example only, with reference to the accompanying drawings in which.

DETAILED DESCRIPTION

The subject matter of the present disclosure will now be described more fully hereinafter with reference to the accompanying drawings, in which illustrative embodiments of the disclosure are shown. These illustrative embodiments may, however, be implemented in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout. As used herein, the term "and/or" includes any and all combinations of one or more of the associated listed items.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
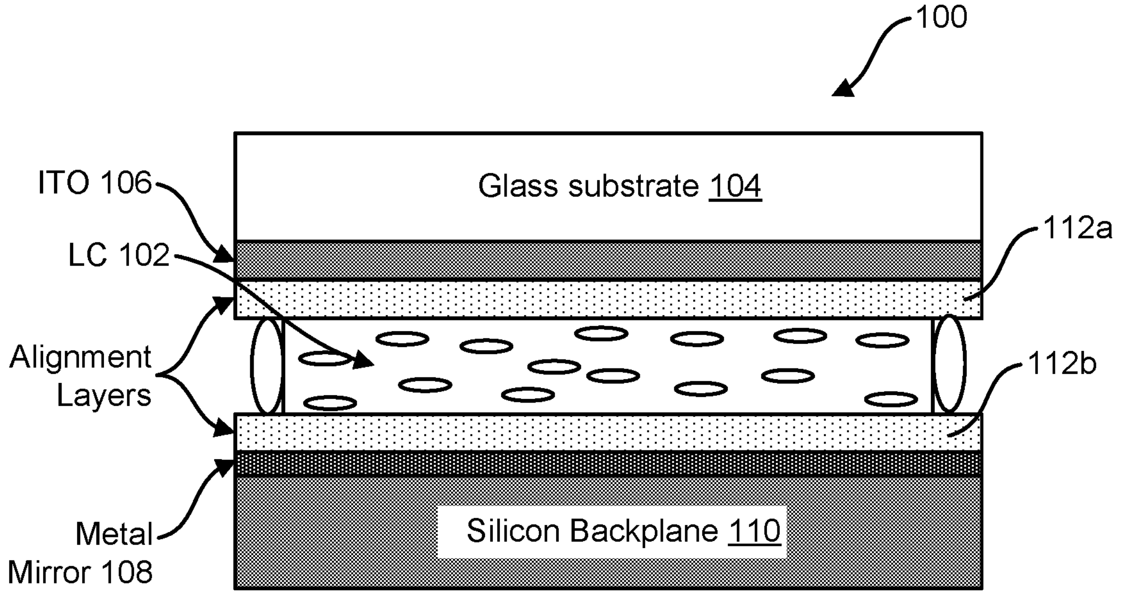
FIG. 1 is a side view of a LCOS phase modulator.
Figure 2:
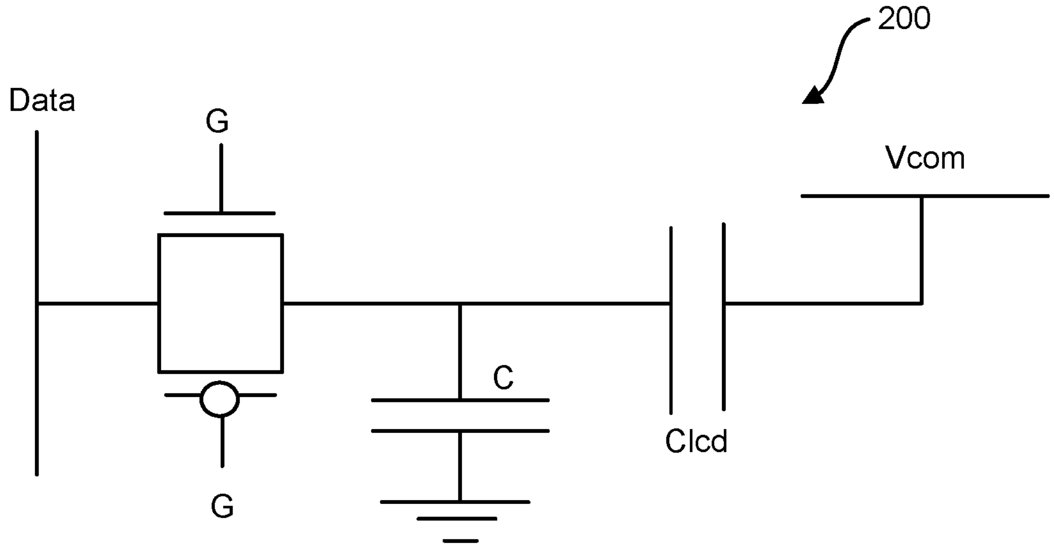
FIG. 2 is a schematic diagram of an analog pixel circuit.
Figure 3:
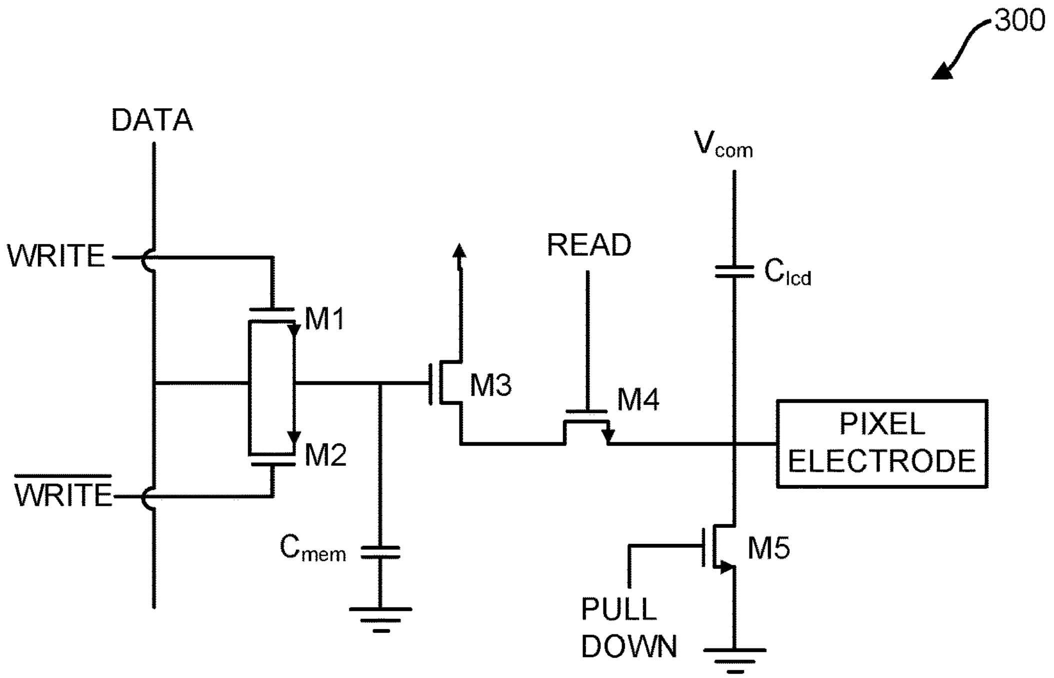
FIG. 3 is a schematic diagram of prior art of the frame buffer pixel circuit.
Figure 4:
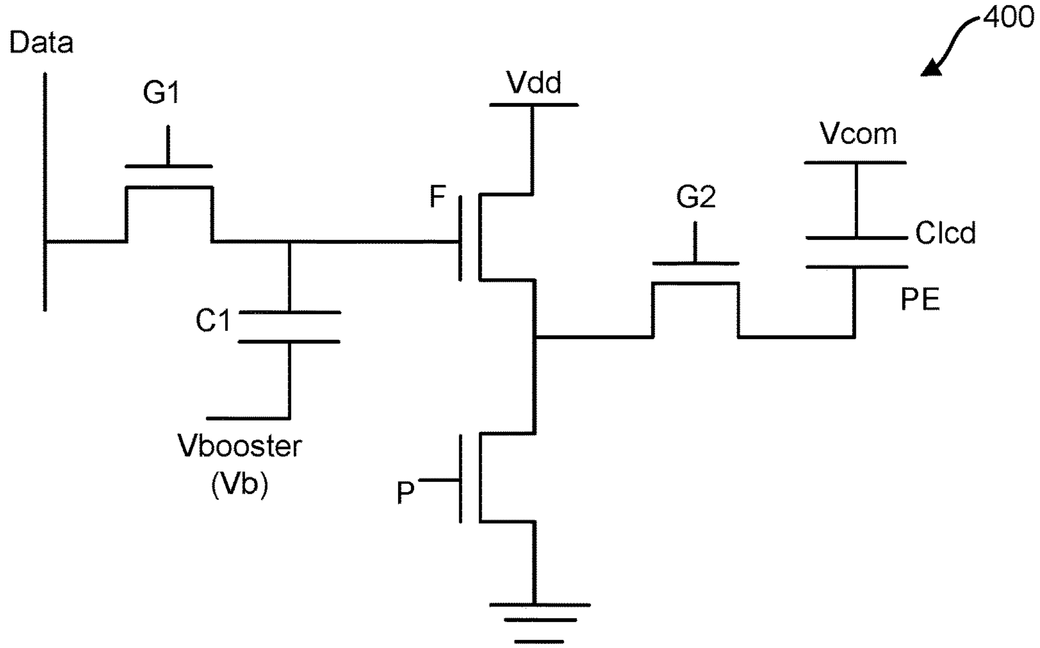
FIG. 4 is a schematic diagram of first embodiment of frame buffer pixel circuit.

A first embodiment of a frame buffer pixel circuit 400 is shown in FIG. 4 which is composed of first data pass gate transistor G1, first storage capacitor C1, a voltage boosting line Vb, source follower transistor F, pull-down transistor P, and second data pass gate transistor G2. As compared with previous frame buffer pixel circuit 300 shown in FIG. 3, the differences include, but are not limited to: 1) pull-down transistor P here is connected to the drain of transistor F and source of transistor G2; 2) storage capacitor C1 is connected to a voltage boosting line Vb, instead of GND; and 3) all transistors are NMOS transistors.

Positioning transistor P to the place before G2 can reduce current leakage for Clcd and the parasitic gate capacitors so that increase the voltage stability. With the voltage boosting Vb, the pixel output voltage range can be expanded to much larger than that without volage boosters. In the operation, the Vb is set to zero volt when data is transferring to C1 capacitor through G1 gate. After the frame data are loaded onto C1 capacitors in all pixels, Vb is set to designed voltage and G2 gates in all pixels are opened to charge Clcd capacitors. Vb is then set to zero volt again before starting to load next frame data onto pixels. Such process is iterated in the LCOS working time.

Figure 5:
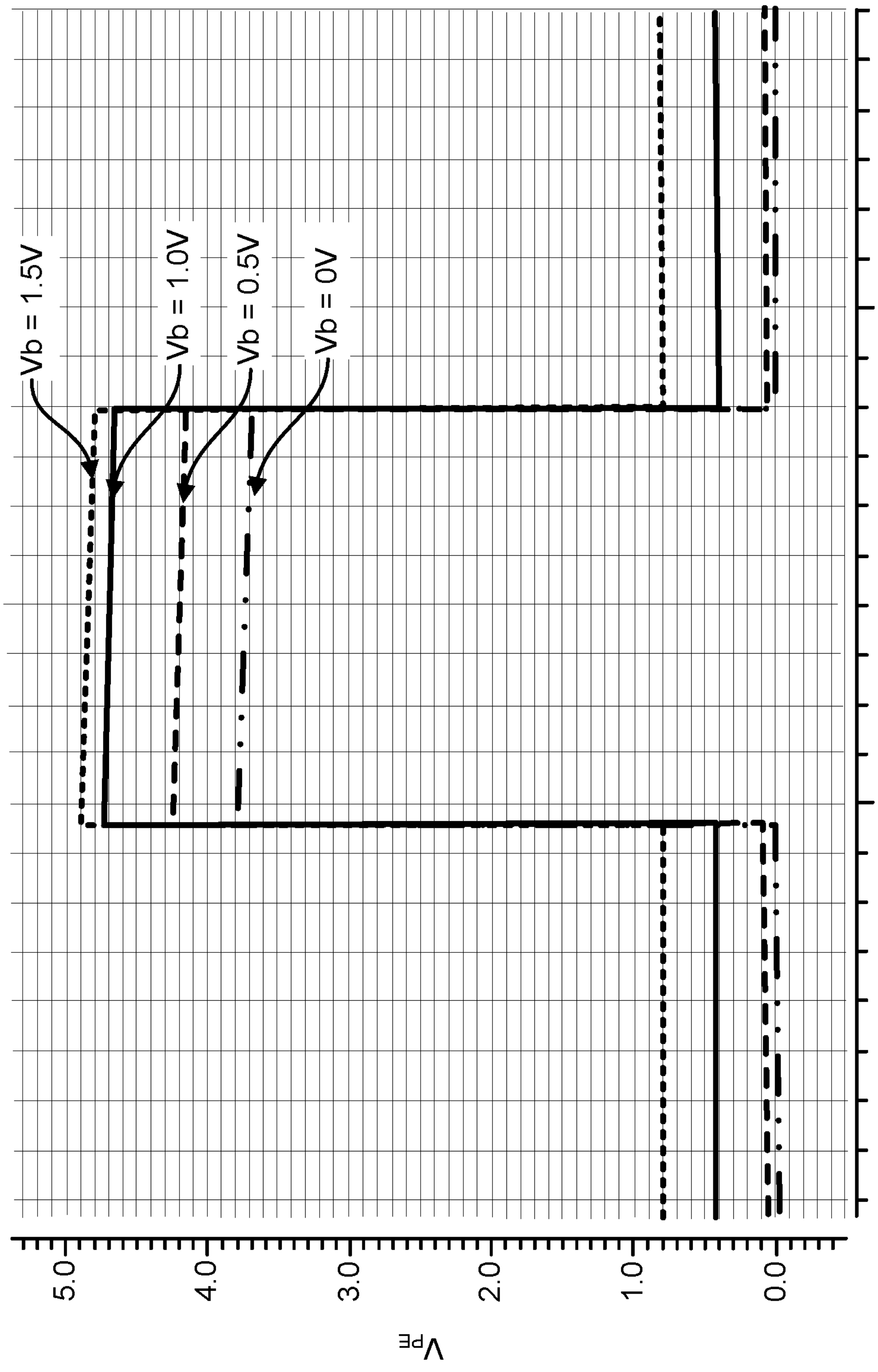
FIG. 5 is a simulation result of output voltage ranges of the first embodiment of frame buffer pixel circuit.

FIG. 5 shows the simulation result of output voltage ranges for the first embodiment of frame buffer pixels with different boosting voltages. The simulation result shows that the maximum voltage range can be achieved when Vb is around transistor threshold voltage, for example 0.8V here. The maximum output voltage range is larger than 4V, similar to that of prior art of frame buffer pixel circuit. As compared with the prior art of frame buffer pixel that uses CMOS gate transistors, this circuit uses all NMOS transistors, simplifying the circuit structure that helps in designing small size pixel and high resolution LCOS phase modulators. A LCOS phase modulator with this pixel circuit has advantages for some special applications such as holographic displays and color sequential displays in which small pixel size and high resolution are extremely important in order to achieve large viewing angle and high image quality displays.

Holographic display allows the viewer to look around objects and see them from different perspectives. This leads to a more comfortable and naturalistic viewing experience without all the intricacies associated with stereo 3-D display. In recent years, the development of digital and computer-generated holographic display technologies has widely conducted in institutes and industry companies. Holographic communication may be one of the most intriguing features of six generation (6G) of networks. Following the progress of 5G/6G network deployment, the holographic display will become more and more attractive to researchers, engineers, investors, and consumers. The core components in such holographic display systems are the phase modulators. The LCOS phase modulator has competitive advantages over others, such as high resolution, small size pixels, and high pixel fill factor. For holographic display with conventional LCOS phase modulators, in order to minimize high diffraction order light flickering, the light has to be blocked during data loading time. LCOS phase modulators with frame buffer pixel circuits can perform data loading and display in parallel, resulting in several advantages over general LCOS phase modulators, for example, higher optical efficiency, higher display quality, and lower high order diffracted light flickering. Therefore, such phase modulators have high potential to be used in computer-generated holographic displays.

Color sequential display system is much simpler than common color display systems, including less spatial light modulators and much simpler optical system. Color sequential LCOS display has been widely used in projection displays, wearable displays including near-eye displays, and smart watches. For color sequential displays, LCOS phase modulators with frame buffer pixel circuits have significant advantages over general LCOS phase modulators, for example much higher optical power efficiency and much higher display quality. With a traditional LCOS phase modulator, the light is blocked during data loading time and the light is only on during display period of time. With a frame buffer pixel based LCOS phase modulator, the data loading and display can be done in parallel so the light efficiency and display quality can be significantly improved.

The wavefront correction is mainly used for astronomical observations and is also used in free-space optical (FSO) communication. In the astronomical observation and flight object tracking, atmospheric turbulence causes two effects on telescope images: image resolution degradation and intensity degradation. Through dynamically correcting the wavefront distortion, the image quality can be significantly improved, and the light intensity can be increased. Using a LCOS phase modulator with frame buffer pixels can perform frame at a time wavefront correction that can significantly improve the image quality as compared with using a line scanning LCOS phase modulator.

Figure 6A:
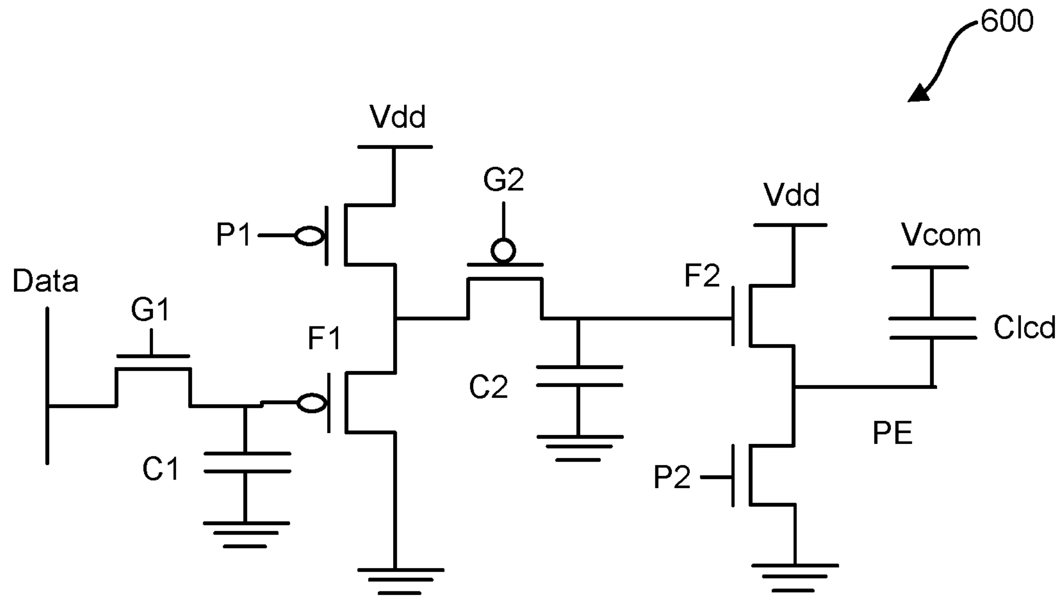
FIGS. 6A and 6B are schematic diagrams of second embodiment of frame buffer pixel circuits.

FIG. 6A shows a second embodiment of a frame buffer pixel circuit 600, which includes data input line, first data pass gate transistor G1, first data storage capacitor C1, first source follower transistor F1, pull-up transistor P1, second pass gate transistor G2, second data storage capacitor C2, second source follower transistor F2, and pull-down transistor P2. In the operation, a signal data is sent to the source end of G1 through data line. When first transistor gate G1 is opened, the data is transferred to the drain of the transistor and is stored at the first storage capacitor C1. After C1 is fully charged, G1 gate is closed. When a whole frame data are fully loaded into C1 capacitors in all pixels, the second G2 gates in all pixels are opened simultaneously. The whole frame data are transferred and stored at C2 capacitors in all pixels. When C2 capacitors are fully charged, the G2 gates are closed. The second source follower F2 is then charging Clcd and parasitic capacitors, providing voltage PE to drive the LC element. The pull-up transistor P1 is opened when gate transistor G2 is opened and then is closed after G2 is closed so that the capacitor C2 is fully charged. The pull-down transistor P2 is used to clean capacitance at PE point before Clcd is charged.

Figure 6B:
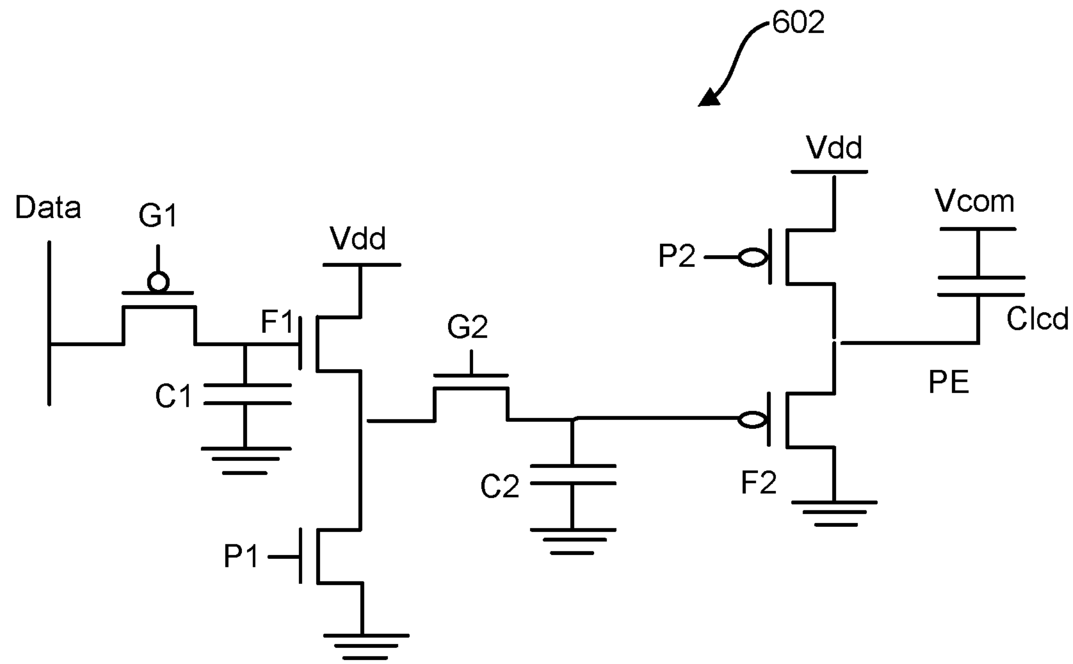

Since there are two source followers in the pixel circuit, the design needs to be optimized so that the circuit can provide large enough output voltage range to drive LC elements with large grey scale. To maximize the output voltage range, two source followers have one follower with a PMOS transistor (circuit 600) and the other one with an NMOS transistor (circuit 602) as shown in FIGS. 6A and 6B, respectively.

Figure 7:
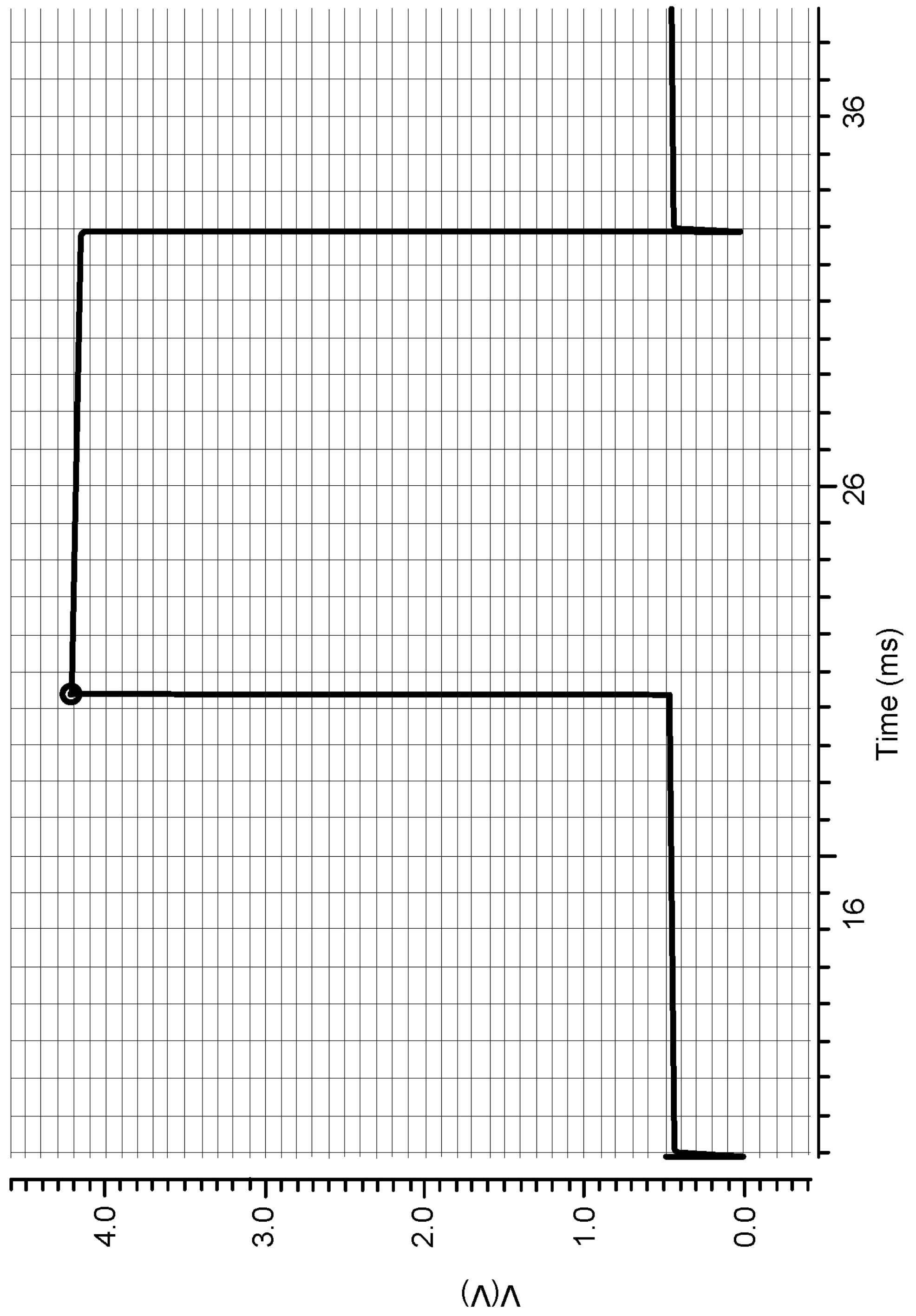
FIG. 7 is a simulation result of output voltage range and voltage holding ratio of the second embodiment of frame buffer pixel circuit.

FIG. 7 shows the simulation result of pixel output voltage range and voltage holding ratio. The output voltage range is >3.0V that is, in general, high enough to fully drive LC elements. In the circuits, the data storage capacitor C2 and the LC driving electrode PE is separated by the second source follower, so the C2 is not affected by LC element, shunt current leakage, and around pixel interferences. Therefore, voltage holding ratio is highly improved as compared with the prior art of frame buffer pixel circuit. A LCOS phase modulator with such pixel circuit can have advantages for the applications that have strict requirement on phase modulation flickering, such as LCOS phase modulators for wavelength selective switch (WSS) that is widely used in optical telecom networks.

Figure 8:
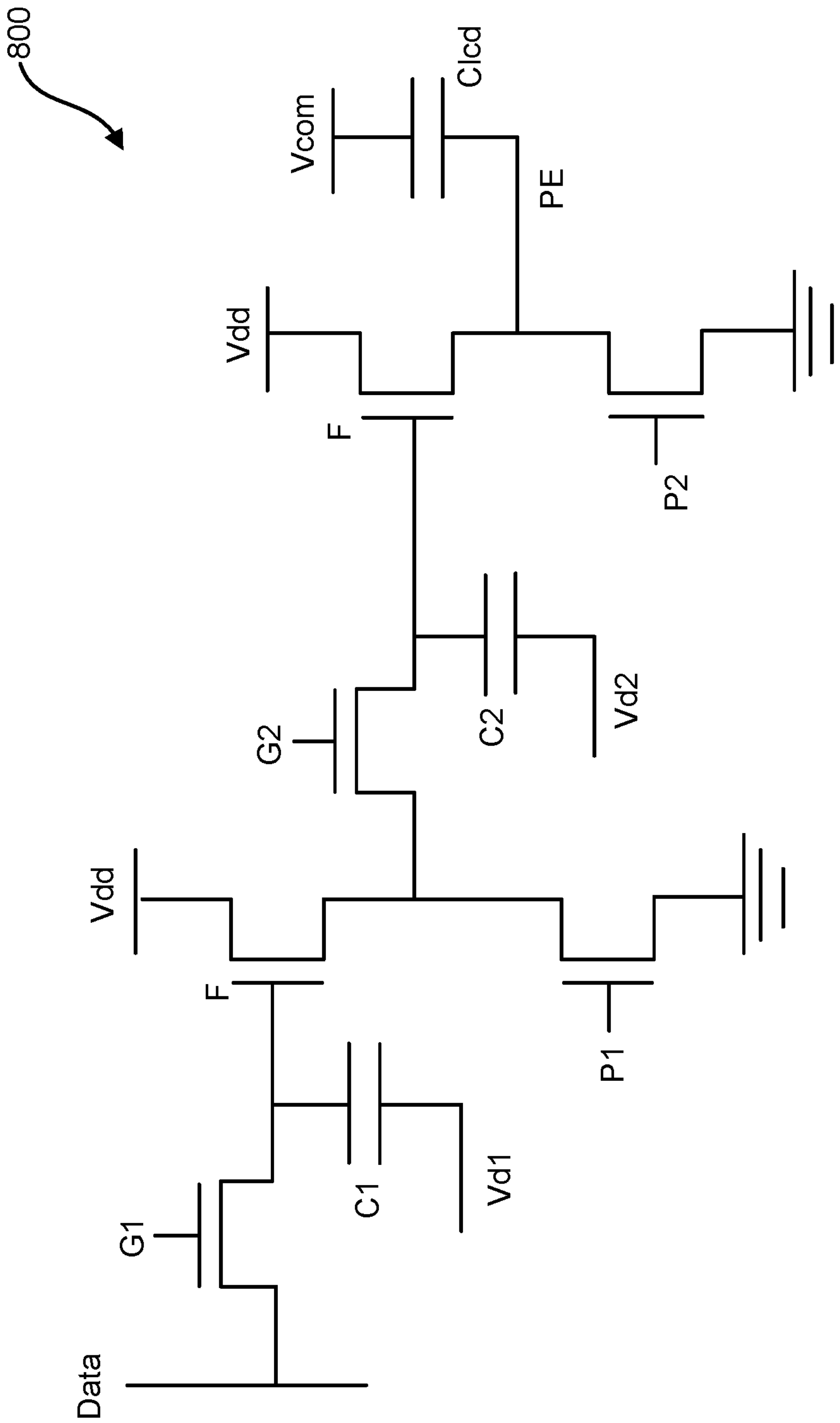
FIG. 8 is a schematic diagram of third embodiment of frame buffer pixel circuit.

A third embodiment of a frame buffer pixel circuit 800 is shown in FIG. 8. As compared with the second embodiment of frame buffer pixel circuit 600/602, this pixel circuit 800 is changed to use all NMOS transistors and data storage capacitors C1 and C2 are connected to voltage boosting lines Vb1 and Vb2, respectively. In the operation, the Vb1 is set to zero volt when data is transferring to C1 through G1 gate. After the frame data are loaded onto C1 capacitors in all pixels, Vb1 is set to designed voltage and G2 gates in all pixels are opened to charge C2 capacitors to the designed potential voltages. After G2 gates are closed, Vb2 is set to the designed voltage to enlarge the voltages at PE points.

Figure 9:
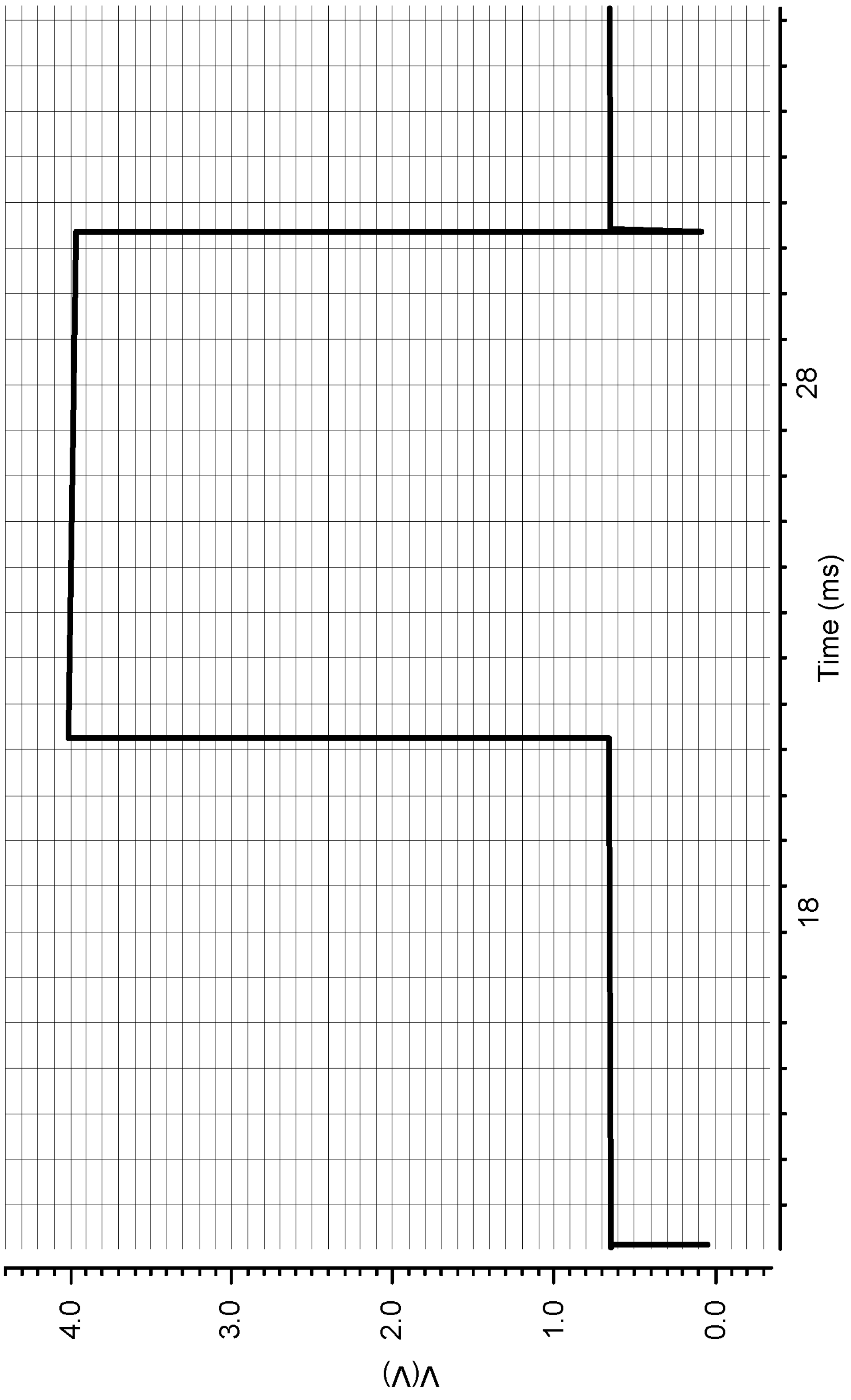
FIG. 9 is a simulation result of output voltage range and voltage holding ratio of the third embodiment of frame buffer pixel circuit.

FIG. 9 shows the simulation results of output voltage range and voltage holding ratio of this third embodiment of frame buffer pixel 800. From the simulation results, the output voltage range is >3.0V and the voltage is very stable. Using only NMOS transistors in this circuit has the potential to simplify the circuit design and improve the performance.

Reconfigurable Add/Drop Multiplexer (ROADM) facilitates the addition of new services without requiring an expensive upgrade or substantial change to telecom networks. A ROADM system allows remote, precise, and flexible selection of wavelengths, so significantly increasing the network capacity without major expense. The ROADM market is forecasted to have tremendous growth following the progress of deployment of 5G/6G networks. LCOS phase modulators are widely used in WSS systems that are core subsystems of ROADM systems. Currently, all used LCOS phase modulators can only perform polarization dependent phase modulation. Accordingly, the light polarization needs to be carefully manipulated, resulting in complicated optical systems. The second and third frame buffer pixel circuits can be used in polarization independent LCOS (PI-LCOS) phase modulators. With PI-LCOS phase modulators, the WSS systems can have much simpler optical systems, higher performance, and lower cost as compared with WSS systems with general LCOS phase modulators.

In the drawings and specifications, there have been disclosed exemplary embodiments of the disclosure. However, many variations and modifications can be made to these embodiments without substantially departing from the principles of the present disclosure. Accordingly, although specific terms are used, they are used in a generic and descriptive sense only and not for purposes of limitation, the scope of the disclosure being defined by the following claims.

What is claimed:

1. A circuit of controlling a pixel electrode of a liquid crystal on silicon backplane phase modulator, comprising:
- two data transfer controllers;
- a data storage capacitor;
- a voltage booster directly connected to the data storage capacitor; and
- a source follower transistor in series with a pull-down unit transistor,
- wherein the circuit is configured to first transfer an analog data signal through first data transfer controller and is configured to store at the data storage capacitor; and
- wherein the voltage booster is configured to switch from zero volts to a desired voltage and is configured to then transfer the data through the second controller to a liquid crystal driving electrode.

2. The circuit of claim 1, wherein the pull-down transistor is positioned before the second data transfer controller.

3. The circuit of claim 1, wherein transistors in the circuit are all NMOS transistors.

4. The circuit of claim 1, wherein the data storage capacitor is connected to a gate transistor that can provide 0V or a desired boosting voltage.

5. A system for controlling a pixel electrode of a liquid crystal on silicon backplane phase modulator, the system comprising:
- a first data transfer controller and a second data transfer controller,
- one data storage capacitor, a voltage booster directly connected to the data storage capacitor, and a source follower transistor in series with a pull-down transistor, wherein the voltage booster is configured to switch from zero volts to a predetermined voltage and is configured to then transfer the data through the second data transfer controller to a liquid crystal driving electrode.

6. The system of claim 5, wherein an analog data signal is first transferred through the first data transfer controller and stored at the storage capacitor.

7. The system of claim 5, wherein further comprising the pull-down transistor positioned before the second data transfer controller.

8. The system of claim 5, wherein each transistor in the system is an NMOS transistor.

9. The system of claim 5, further comprising a data storage capacitor connected to a gate transistor that can provide 0V or a predetermined boosting voltage.

* * * * *